United States Patent
Tokutomi

(10) Patent No.: US 10,807,282 B2
(45) Date of Patent: Oct. 20, 2020

(54) FIBER-REINFORCED PLASTIC PRODUCING DEVICE, MOVABLE STAGE, SHAPED FABRIC PRODUCING METHOD, AND FIBER-REINFORCED PLASTIC PRODUCING METHOD

(71) Applicant: MITSUBISHI HEAVY INDUSTRIES, LTD., Tokyo (JP)

(72) Inventor: Hiroshi Tokutomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 255 days.

(21) Appl. No.: 15/572,363

(22) PCT Filed: Jul. 29, 2016

(86) PCT No.: PCT/JP2016/072346
§ 371 (c)(1),
(2) Date: Nov. 7, 2017

(87) PCT Pub. No.: WO2017/022667
PCT Pub. Date: Feb. 9, 2017

(65) Prior Publication Data
US 2018/0126604 A1    May 10, 2018

(30) Foreign Application Priority Data
Aug. 6, 2015 (JP) .................... 2015-155896

(51) Int. Cl.
*B29C 39/10* (2006.01)
*B29C 39/26* (2006.01)
(Continued)

(52) U.S. Cl.
CPC .............. *B29C 39/10* (2013.01); *B29C 39/22* (2013.01); *B29C 39/26* (2013.01); *B29C 39/42* (2013.01);
(Continued)

(58) Field of Classification Search
CPC ....... B29C 70/56; B29C 66/343; B29C 70/34; B29C 70/02
See application file for complete search history.

(56) References Cited

U.S. PATENT DOCUMENTS 5,648,109 A    7/1997  Gutowski et al.
5,746,138 A *  5/1998  Hirose ................. B25J 9/106
                                                    108/143

(Continued)

FOREIGN PATENT DOCUMENTS

| JP | 2006-312260 A | 11/2006 |
| JP | 2007-260925 A | 10/2007 |
| JP | 2010-115867 A | 5/2010 |
| JP | 2010-120167 A | 6/2010 |
| JP | 2015-231740 A | 12/2015 |

OTHER PUBLICATIONS

PCT/ISA/210, "International Search Report for International Application No. PCT/JP2016/072346," dated Sep. 6, 2016.

(Continued)

*Primary Examiner* — Jacob T Minskey
*Assistant Examiner* — Virak Nguon
(74) *Attorney, Agent, or Firm* — Manabu Kanesaka; Benjamin Hauptman; Kenneth Berner

(57) ABSTRACT

It is provided a fiber-reinforced-plastic producing device, a movable stage, a shaped fabric producing method, and a fiber-reinforced-plastic producing method, with which when a fabric is bent in a resin transfer molding method, wrinkles can be prevented from being formed in the vicinity of the bent portion. The fiber-reinforced-plastic producing device includes a molding die having a first placement surface on which a fabric is placed, and a formation surface having a predetermined angle with respect to the first placement surface; and a movable stage having a second placement surface on which an end section of the fabric is placed, and located adjacent to the molding die, wherein the movable stage is configured so as to be movable below the first (Continued)

placement surface after the second placement surface forms a continuous plane with the first placement surface and is inclined with respect to the first placement surface.

7 Claims, 8 Drawing Sheets

(51) Int. Cl.
| | |
|---|---|
| B29C 43/12 | (2006.01) |
| B29C 39/22 | (2006.01) |
| B29C 70/44 | (2006.01) |
| B29C 53/04 | (2006.01) |
| B29C 53/02 | (2006.01) |
| B29C 39/42 | (2006.01) |
| B64C 1/12 | (2006.01) |

(52) U.S. Cl.
CPC ............... *B29C 43/12* (2013.01); *B29C 53/02* (2013.01); *B29C 53/04* (2013.01); *B29C 70/443* (2013.01); *B64C 1/12* (2013.01)

(56) References Cited

U.S. PATENT DOCUMENTS

| | | | |
|---|---|---|---|
| 8,282,375 B2 * | 10/2012 | Petersson | B29C 43/12 |
| | | | 425/112 |
| 9,205,602 B2 * | 12/2015 | Shinoda | B29C 43/3642 |
| 9,914,268 B2 * | 3/2018 | Coxon | B29C 70/342 |
| 2003/0075657 A1 * | 4/2003 | Joubert | B66F 7/0608 |
| | | | 248/277.1 |
| 2006/0249883 A1 | 11/2006 | Oguma et al. | |
| 2011/0127698 A1 * | 6/2011 | Alenby | B29C 70/44 |
| | | | 264/510 |
| 2015/0352795 A1 | 12/2015 | Coxon et al. | |
| 2016/0207266 A1 * | 7/2016 | Koncz | B29C 70/02 |

OTHER PUBLICATIONS

PCT/ISA/237, "Written Opinion of the International Searching Authority for International Application No. PCT/JP2016/072346," dated Sep. 6, 2016.
Europe Patent Office, Search Report for European Patent Application No. 16832946.4, dated May 16, 2018.

* cited by examiner

FIBER-REINFORCED PLASTIC PRODUCING DEVICE, MOVABLE STAGE, SHAPED FABRIC PRODUCING METHOD, AND FIBER-REINFORCED PLASTIC PRODUCING METHOD

RELATED APPLICATIONS

The present application is National Phase of International Application No. PCT/JP2016/072346 filed Jul. 29, 2016, and claims priority from Japanese Application No. 2015-155896, filed Aug. 6, 2015, the disclosure of which is hereby incorporated by reference herein in its entirety.

TECHNICAL FIELD

The present invention relates to a fiber-reinforced plastic producing device, a movable stage, a shaped fabric producing method, and a fiber-reinforced plastic producing method.

BACKGROUND ART

The notion of forming structural materials for aircraft or the like with FRP (fiber-reinforced plastic) is known. Structural materials are not limited to flat members, and may have a C-shaped cross-sectional shape, that is, a groove type (C-type).

One example of an FRP molding method is an RTM (Resin Transfer Molding) method, wherein a reinforcing fabric (preform) which has not been impregnated with a resin is impregnated with a resin. In a resin transfer molding method, when a structural material made of FRP having a cross-sectional shape such as the C-shape described above is to be formed, a dry reinforcing fabric (preform) is formed (shaped) in advance by a molding die so as to have the cross-sectional shape of the structural member made of FRP.

Patent Document 1 described below discloses technology which makes it unnecessary to release or convey a preform from a molding die when a preform which maintains the shape of a final product is formed in a resin transfer molding method.

CITATION LIST

Patent Literature

Patent Document 1: JP-A-2007-260925

SUMMARY OF INVENTION

Technical Problems

In the technology described in Patent Document 1 above, a laminate of a reinforcing fabric and a secondary molding material for infusing a matrix resin are disposed on a shaping die. These are covered with a sheet and sealed, and the sealed space is subjected to vacuum suction so as to shape the laminate by making the laminate adhere to the shaping die.

However, when the laminate of the reinforcing fabric is made to adhere to the shaping die, there is a problem in that wrinkles or folds are formed in the vicinity of the bent portion of the laminate. This is because the curvature differs between the inside layer and the outside layer where the respective layers of the laminate of the reinforcing fabric are in contact with one another, as a result, misalignment occurs between the inside layer and the outside layer due to frictional resistance. The laminate is then bent by the frictional force and the welding pressure generated under vacuum while misalignment remains between each of the layers of the reinforcing fabric, as a result, wrinkles or folds are formed.

In the technology described in Patent Document 1 above, the lower surface side of the reinforcing fabric is not supported, so the reinforcing fabric may be bent as a result of falling due to gravity rather than being bent by a force applied from a sheet. In this case, wrinkles or folds are formed in the vicinity of the bent portion of the laminate.

The present invention was conceived in light of such circumstances, and an object of the present invention is to provide a fiber-reinforced plastic producing device, a movable stage, a shaped fabric producing method, and a fiber-reinforced plastic producing method whereby the formation of wrinkles or folds in the vicinity of a bent portion can be prevented when a fabric is bent in a resin transfer molding method.

Solution to Problems

The fiber-reinforced plastic producing device of a first aspect of the present invention includes: a molding die having a first placement surface for the placement of a fabric and a formation surface having a predetermined angle with respect to the first placement surface; and a movable stage having a second placement surface for the placement of an end side of the fabric, and being disposed adjacent to the molding die; the movable stage being configured so that the second placement surface forms a continuous plane with the first placement surface and can move below the first placement surface after being inclined with respect to the first placement surface.

With such a configuration, since the molding die has a first placement surface and a formation surface, the fabric is bent along the first placement surface and the formation surface so as to be formed into a cross-sectional shape corresponding to the molding die. In addition, the first placement surface of the molding die and the second placement surface of the movable stage form a continuous plane. The second placement surface of the movable stage is inclined with respect to the first placement surface from a state in which the fabric is placed on the first placement surface and the second placement surface. As a result, the fabric is bent along the edge of the first placement surface of the molding die. The second placement surface then moves below the first placement surface so that the fabric is disposed along the formation surface of the molding die. When the second placement surface moves below the first placement surface, the second placement surface of the movable stage is inclined with respect to the first placement surface, and the fabric is supported from below. Therefore, wrinkles are less likely to be formed in the bent portion of the fabric than when a movable stage is not used. The continuous plane formed by the first placement surface of the molding die and the second placement surface of the movable stage also includes cases in which a gap is provided between the first placement surface and the second placement surface.

In the first aspect described above, the second placement surface of the movable stage is configured so as to be inclined with respect to the first placement surface in a state in which the molding die side is higher than the opposite side of the molding die side.

With this configuration, the fabric is bent at the border of the first placement surface and the second placement surface and tilts in accordance with the slope of the second placement surface.

In the first aspect described above, the second placement surface of the movable stage is inclined with respect to the first placement surface in a state in which the opposite side of the molding die side is higher than the molding die side.

With this configuration, the fabric is bent at the edge of the first placement surface and is bent near a point in contact with the second placement surface. That is, when the second placement surface of the movable stage is inclined with respect to the first placement surface, the fabric is bent twice, and the respective bending directions are opposite one another, so misalignment is unlikely to occur between the inside layer and the outside layer, and wrinkles are unlikely to be formed.

In the first aspect described above, the movable stage further has a leg part which supports the second placement surface and contracts in a height direction of the molding die, and a connection part with which the second placement surface and the leg part are connected so that the second placement surface rotates with respect to the leg part.

With this configuration, the inclination of the second placement surface with respect to the first placement surface is achieved by the rotation of the second placement surface with respect to the leg part, and the movement of the second placement surface to below the first placement surface is achieved by the contraction of the second placement surface in the height direction of the molding die.

In the first aspect described above, a first elastic member is provided in the connection part; a second elastic member is provided in the leg part; and an elastic force of the first elastic member is lower than an elastic force of the second elastic member.

With this configuration, when a pressure force is applied, the first elastic member having a lower elastic force provided in the connection part contracts prior to the second elastic member provided in the leg portion. As a result, the second placement surface rotates with respect to the leg part, and after the second placement surface is inclined, the leg part then contracts in the height direction of the molding die.

The movable stage of a second aspect of the present invention has a second placement surface disposed adjacent to a molding die having a formation surface having a predetermined angle with respect to a first placement surface, an end side of a fabric being placed on the second placement surface when the fabric is placed on the first placement surface; and the second placement surface being configured so that the second placement surface forms a continuous plane with the first placement surface and can move below the first placement surface after being inclined with respect to the first placement surface.

The shaped fabric producing method of a third aspect of the present invention includes the steps of: placing a fabric on a first placement surface in a molding die having a first placement surface and a formation surface having a predetermined angle with respect to the first placement surface; placing an end side of the fabric on a second placement surface set so as to form a continuous surface with the first placement surface in a movable stage having a second placement surface and being disposed adjacent to the molding die; allowing the second placement surface to be inclined with respect to the first placement surface; and moving the second placement surface to below the first placement surface.

The third aspect described above may further include the steps of: covering the fabric placed on the first placement surface and the second placement surface with a back film; and performing vacuum suction on a space further inside than the back film; wherein the space further inside than the back film is depressurized, and the back film presses against the second placement surface so that the second placement surface is inclined with respect to the first placement surface and moves below the first placement surface.

The fiber-reinforced plastic producing method of a fourth aspect of the present invention includes: placing a fabric on a first placement surface in a molding die having a first placement surface and a formation surface having a predetermined angle with respect to the first placement surface; placing an end side of the fabric on a second placement surface set so as to form a continuous surface with the first placement surface in a movable stage having a second placement surface and being disposed adjacent to the molding die; allowing the second placement surface to be inclined with respect to the first placement surface; moving the second placement surface to below the first placement surface; covering the fabric placed on the first placement surface and the second placement surface with a back film; performing vacuum suction on a space further inside than the back film; and injecting a resin into the space further inside than the back film.

Advantageous Effects of Invention

With the present invention, it is possible to prevent the formation of wrinkles in the vicinity of a bent portion when a fabric is bent in a resin transfer molding method.

DESCRIPTION OF EMBODIMENTS

First Embodiment

The fiber-reinforced plastic (FRP) producing device of a first embodiment of the present invention and a production method thereof will be described hereinafter with reference to the drawings.

Figure 1:
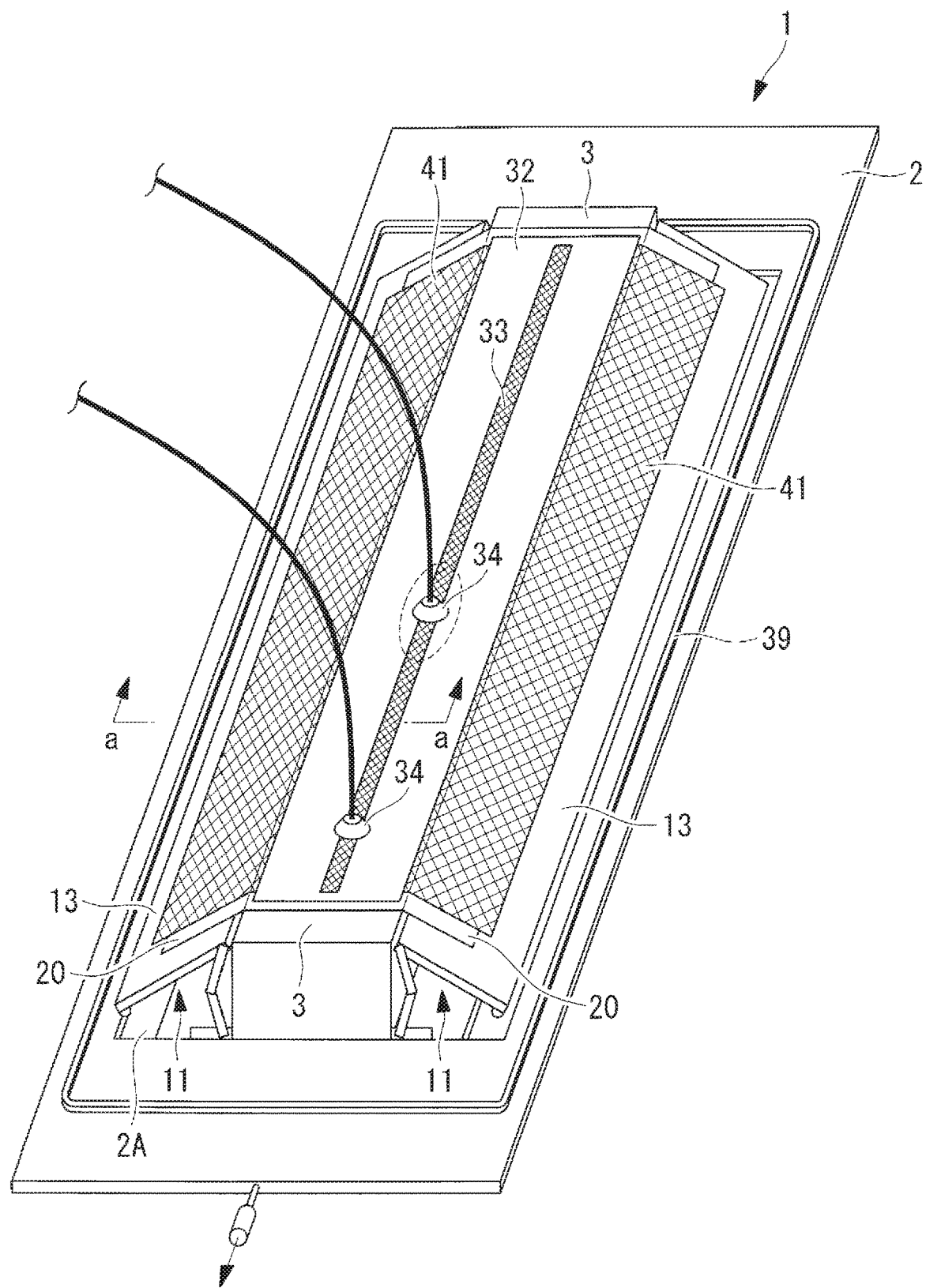
FIG. 1 is a perspective view illustrating the fiber-reinforced plastic producing device of a first embodiment of the present invention.

With the fiber-reinforced plastic producing method of this embodiment, after a fabric 20 is shaped using a molding die 1 and a movable stage 11 constituting a fiber-reinforced plastic producing device such as that illustrated in FIG. 1, a resin is injected into the fabric 20 so that a fiber-reinforced plastic molded product is formed.

The fiber-reinforced plastic is composed of the fabric 20 and the resin.

The fabric 20 is a laminate composed of a plurality of sheet-like members, and the required number of sheet-like members are laminated in accordance with the thickness of the molded product. Any fiber such as a carbon fiber or glass fiber may be used for the fabric 20.

The resin with which the fabric 20 is impregnated is a thermosetting resin which cures by heating such as an epoxy resin, polyimide, polyurethane, or unsaturated polyester, for example. It is also possible to use a thermoplastic resin which hardens by heating such as a polyamide (for example, Nylon (trade name)), polyethylene, polystyrene, or polyvinyl chloride.

A convex-shaped part 3 of the molding die 1 is mounted on the base plate 2 so as to shape the fabric 20. The molding die 1 is then used directly for the molding of the fiber-reinforced plastic after the completion of the shaping of the fabric 20. The convex-shaped part 3 has a first placement surface 3A on which the fabric 20 is placed and a formation surface 3B having a predetermined angle with respect to the first placement surface 3A. Since the convex-shaped part 3 has the first placement surface 3A and the formation surface 3B, the fabric 20 is bent along the first placement surface 3A and the formation surface 3B so as to be formed into a cross-sectional shape corresponding to the convex-shaped part 3.

Note that in the molding die 1, the base plate 2 and the convex-shaped part 3 may be separate units or may be formed integrally.

The fabric 20 is disposed on the first placement surface 3A of the convex-shaped part 3 of the molding die 1. The fabric 20 is disposed while being aligned with the convex-shaped part 3 so that a molded product having a desired shape is obtained in the shaping and subsequent molding steps.

In addition, molding members required to inject and mold the resin are disposed with respect to the fabric 20. Here, molding members refer to members used in a resin transfer molding method such as, a fiber woven fabric 31, a resin pass medium 41, a pressure plate 32, a resin supply port 33, an injection port 34, a suction port 35, and a back film 36.

The molding members that are used may be the same as the members used in an ordinary resin transfer molding method.

The fiber woven fabric 31 is disposed above the fabric 20 and below the resin pass medium 41 and is made of a fiber such as a polyamide (for example, Nylon (trade name)) or polyester, for example. The fiber woven fabric 31 is disposed so that after the resin is cured, the resin supply port 33 does not adhere to the molded product so as to be formed integrally with the molded product.

The resin pass medium 41 is disposed above the fiber woven fabric 31 so as to disperse the resin into the entire fabric.

The pressure plate 32 is disposed between the back film 36 and the fabric 20 and above the resin pass medium 41. The surface of the fiber-reinforced plastic molded product facing the back film 36 is smoothened by the pressure plate 32. When the molded product is flat, a flat plate-like metal material is used for the pressure plate 32. When the cross-sectional shape of the molded product is an arc shape, for example, the cross section of the pressure plate 32 is formed into an arc shape.

The resin supply port 33 is disposed above the pressure plate 32 as linear resin flow path along the longitudinal direction of the molding die 1. The resin supply port 33 guides the resin from the injection port 34 to the entire resin pass medium 41.

The resin supply port 33 is a mesh-like member (thickness: approximately 0.15 to 4.0 mm), a spiral tube, a channel material, or the like made of a polypropylene or polyamide (for example, Nylon (trade name)). When the resin supply port 33 is a mesh-like member, the upper surface of the resin supply port 33 may be covered by the back film 36 so as to secure a resin flow path in a state in which it is compressed by the back film 36 due to vacuum suction.

The injection port 34 from which the resin is injected is provided above the first placement surface 3A of the molding die 1, for example.

A suction port 35 is provided in the formation surface of the molding die 1, and the space between the back film 36 and the molding die 1 is subjected to vacuum suction via the suction port 35. A permeable sheet 37, through which the resin cannot pass but which transmits air, and a permeable member 38 such as a fiber woven fabric are mounted on the inlet of the suction port 35.

The back film 36 is a high-elastic elongation film (such as Strechlon (trade name)), for example, and is disposed so as to cover the entirety of the fabric 20 or the mold 1 and the movable stage 11.

Figure 2:
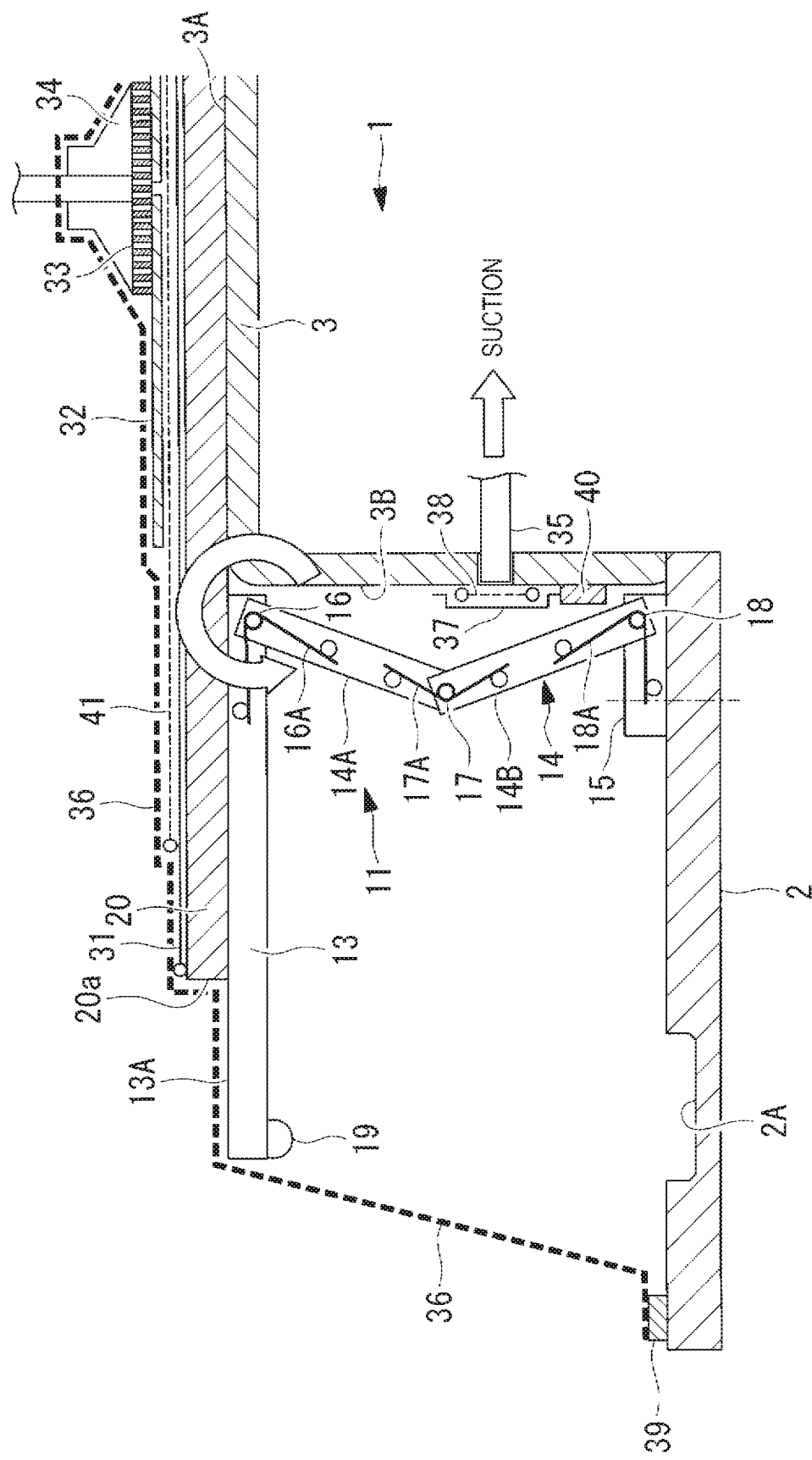
FIG. 2 is a vertical cross-sectional view illustrating the fiber-reinforced plastic producing device of a first embodiment of the present invention in a state in which the plate part of the movable stage is horizontal.
Figure 3:
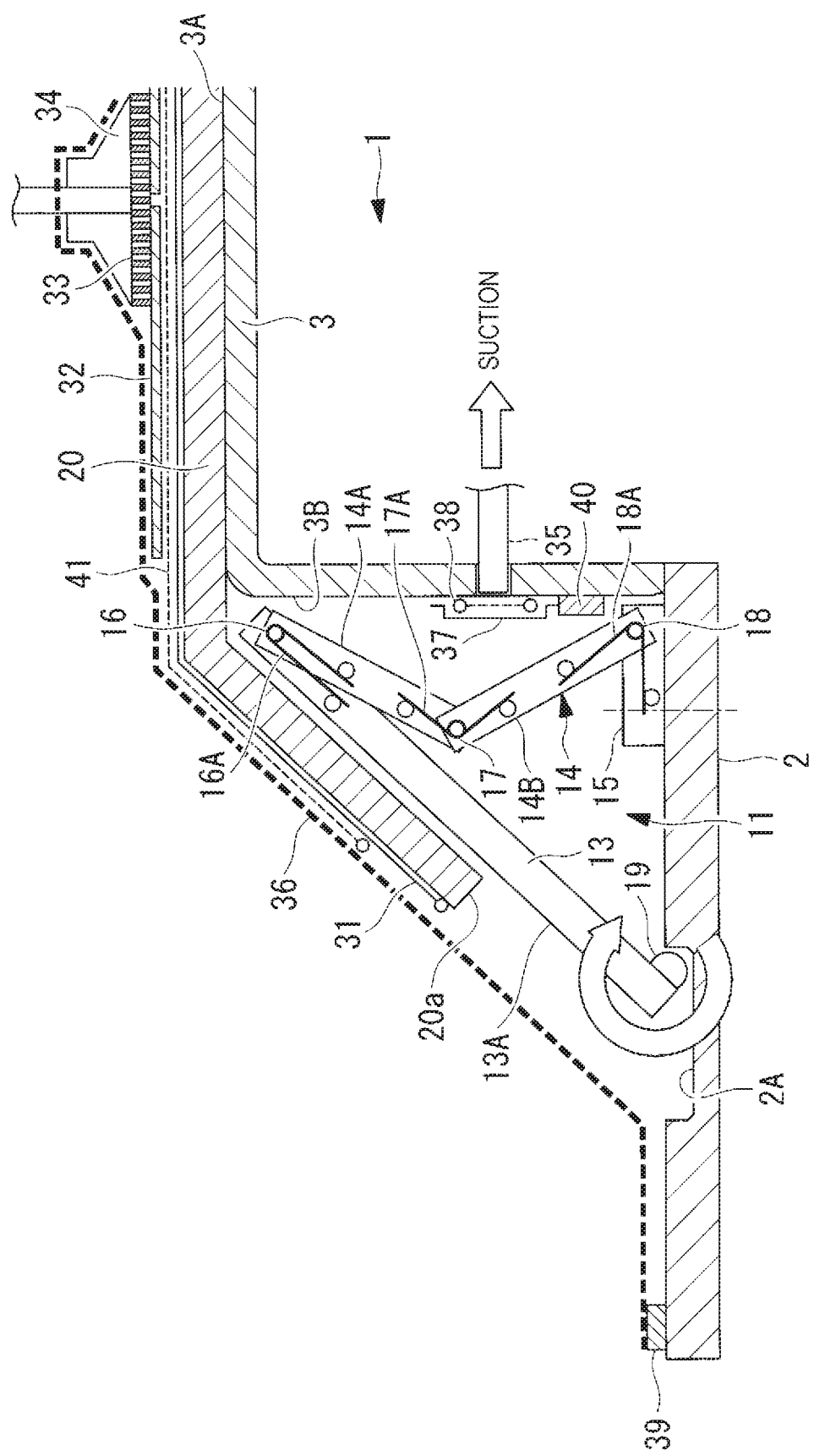
FIG. 3 is a vertical cross-sectional view illustrating the fiber-reinforced plastic producing device of a first embodiment of the present invention in a state in which the plate part of the movable stage is inclined.
Figure 4:
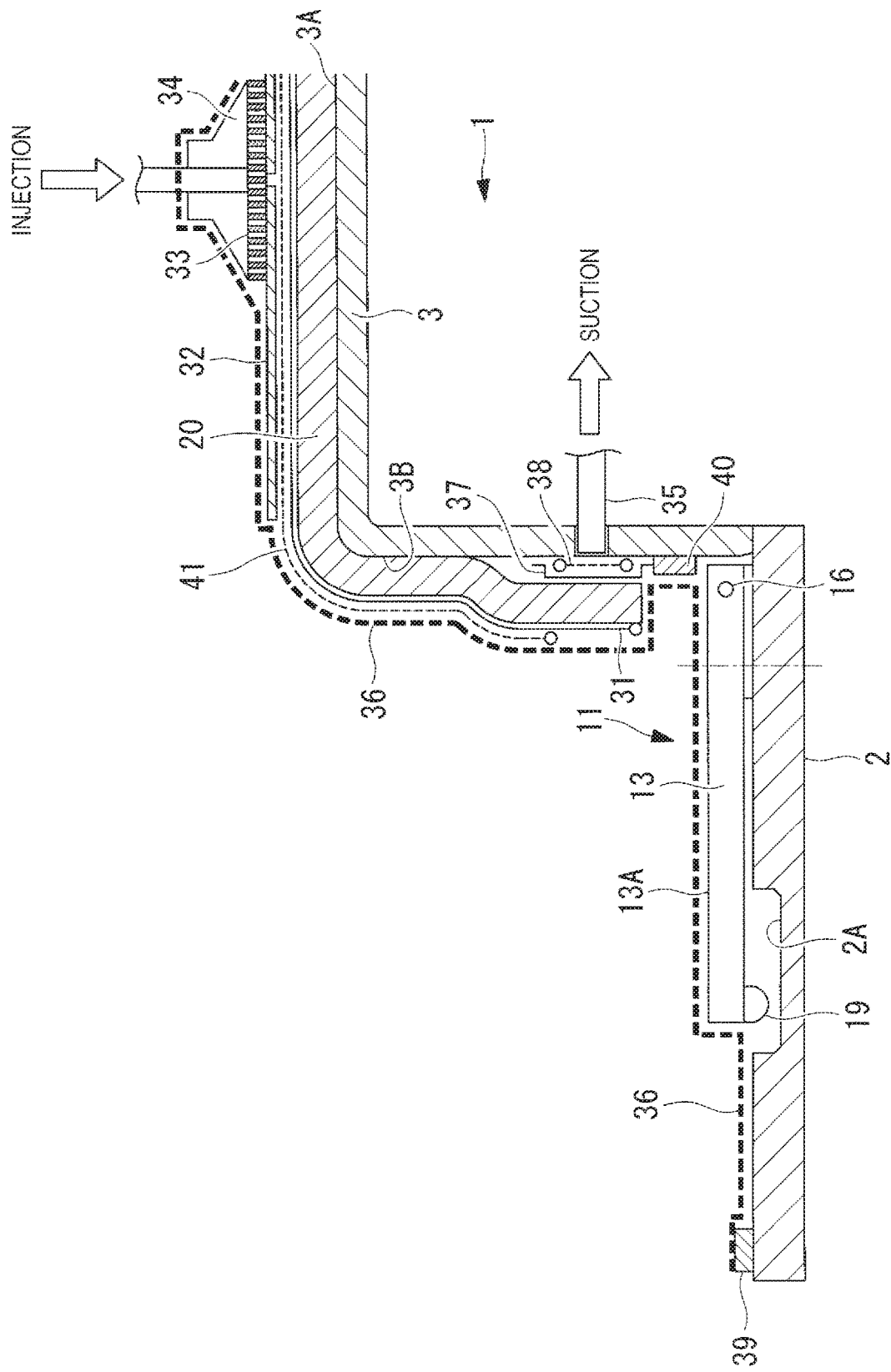
FIG. 4 is a vertical cross-sectional view illustrating the fiber-reinforced plastic producing device of a first embodiment of the present invention in a state in which the movable stage is completely collapsed.
Figure 5:
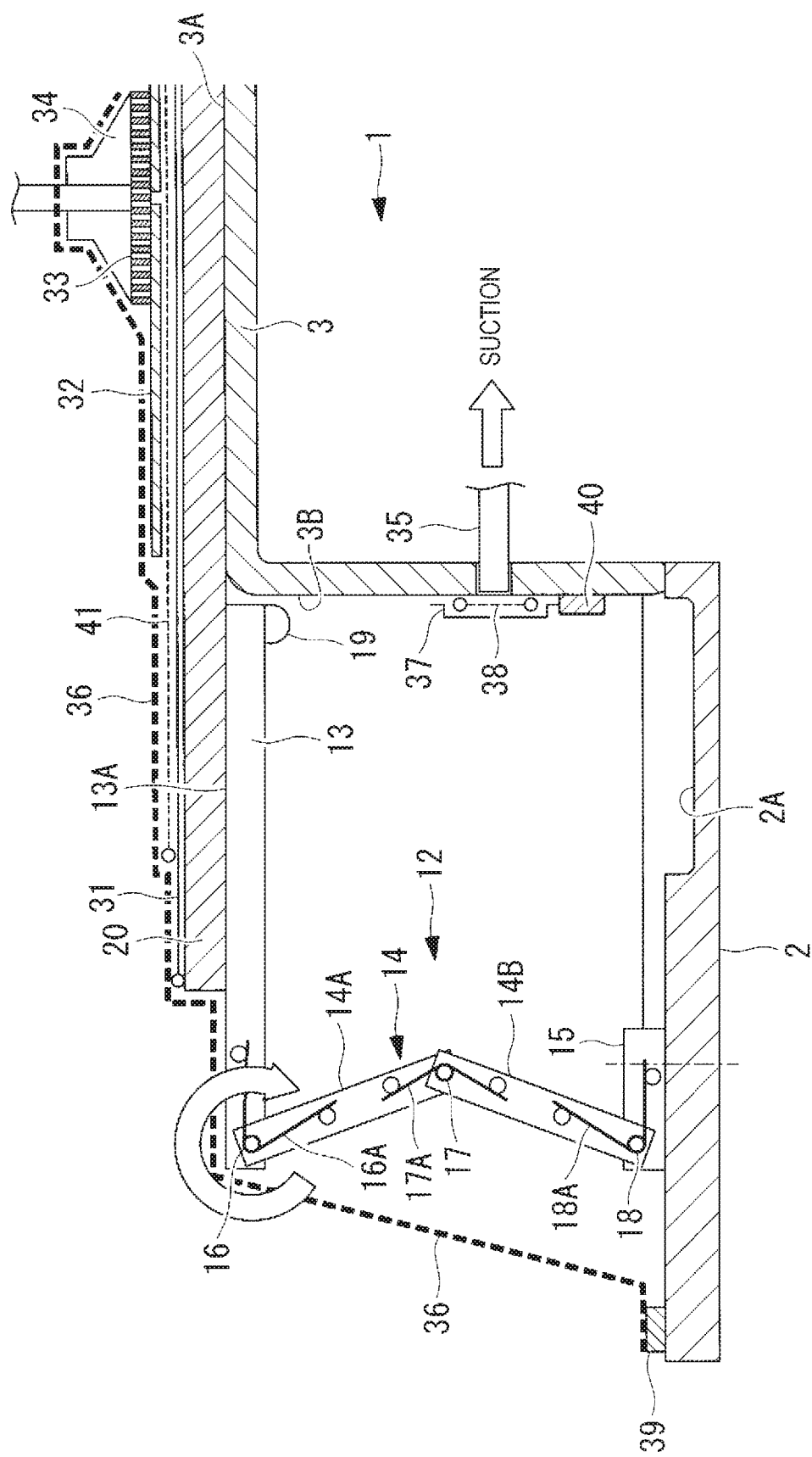
FIG. 5 is a vertical cross-sectional view illustrating the fiber-reinforced plastic producing device of a second embodiment of the present invention in a state in which the plate part of the movable stage is horizontal.

FIG. 2 illustrates a state prior to vacuum suction. FIG. 3 illustrates a state during vacuum suction. FIG. 4 illustrates a state after vacuum suction. FIGS. 2 to 4 are vertical cross-sectional views taken along line a-a in FIG. 1.

As illustrated in FIG. 2, the entirety of the molding die 1 and the movable stage 11, the fabric 20 and the pressure plate 32, and the like are covered from above by the back film 36, and the end part of the back film 36 is attached to the base plate 2 of the molding die 1 using a sealant 39. As a result, the space between the back film 36 and the molding die 1 is sealed.

Next, the injection port 34 is closed, and the space between the back film 36 and the molding die 1 is subjected to vacuum suction from the suction port 35 so that the fabric 20 is crimped against the convex-shaped part 3 and the fabric 20 is shaped as illustrated in FIG. 4.

In this embodiment, the sealed space further inside than the back film 36 is decompressed to a vacuum pressure, and atmospheric pressure is applied to the outside of the back film 36 so that the back film 36 conforms to the molding die 1. As a result, the fabric 20 is shaped along the molding die 1 having the convex-shaped part 3.

Note that the height of the convex-shaped part 3 is set so that the fabric 20 that is shaped after vacuum suction does not reach the base plate 2 of the molding die 1.

After shaping is complete, the back film 36 adheres to the sealant 40 provided on the formation surface 3B, and the back film 36 is thereby attached snugly across the entire molding die 1. A thermosetting resin, for example, is then injected from the injection port 34 so that the fabric 20 is impregnated with the resin. The space between the back film 36 and the molding die 1 is filled with the injected resin. Note that resin injection is achieved by a VaRTM method, an RTM method, an RFI method, or the like, and the fabric 20 is impregnated with the resin by these methods.

Next, the movable stage 11 of this embodiment will be described.

The movable stage 11 is provided with a plate part 13, a leg part 14 for supporting the plate part 13, a fixing part 15 for fixing the leg part 14 to the base plate 2, and the like. The movable stage 11 is disposed adjacent to the molding die 1.

The plate part 13 is a plate-like member, and the upper surface of the plate part 13 is a second placement surface 13A on which the end part 20a side of the fabric 20 is placed. The second placement surface 13A is disposed at a position contiguous with the adjacent first placement surface 3A. That is, in a state before the fabric 20 is pressed using the back film 36, the end part of the second placement surface 13A of the plate part 13 on the side near the molding die 1 and the first connection part 16 described below is at roughly the same height as the end part of the first placement surface 3A. For example, when the second placement surface 13A of the plate part 13 is in a horizontal state, the second placement surface 13A is an extension of the first placement surface 3A of the molding die 1, as illustrated in FIG. 2. Note that when applied to a molded product with an arc-shaped cross section or the like, the plate part 13 may not be disposed in a horizontal state at the stage prior to pressure by the back film 36. Also, note that a gap of approximately 5 mm may be provided between the first placement surface 3A and the second placement surface 13A and that the position at which the first placement surface 3A and the second placement surface 13A described above continue from one another includes cases in which a gap is provided between the two units in this way.

A first connection part 16 connected to the upper end of the leg part 14 is provided on one end side of the plate part 13, and a guide member 19 with a curved outer circumferential surface is provided on the other end side of the plate part 13. The leg part 14 which supports the plate part 13 is connected to the plate part 13 on the molding die 1 side of the plate part 13.

Prior to vacuum suction, the first connection part 16 supports the plate part 13 horizontally. When the back film 36 presses against the plate part 13 due to vacuum suction and a load of at least a prescribed amount is applied from above the plate part 13, the plate part 13 is rotated using the axis of the first connection part 16 as a fulcrum. The plate part 13 rotates around the axis of the first connection part 16.

When the other end side of the plate part 13 touches the base plate 2, the guide member 19 moves the plate part 13 smoothly over the base plate 2 while smoothly rotating the plate part 13. As illustrated in FIG. 4, a groove 2A corresponding to the guide member 19 is formed on the base plate 2 so that the plate part 13 is horizontal when the movable stage 11 is completely collapsed. In addition, a sidewall surface is formed in the groove 2A on the movable stage 11 side, and this sidewall surface interlocks with the guide member 19 so that the movable stage 11 switches the operation from the rotation of the plate part 13 to the bending of the leg part 14.

An elastic member such as a compression spring 16A, for example, is provided on the first connection part 16 so as to support the plate part 13 horizontally until a predetermined load is applied.

The leg part 14 contracts in the height direction of the molding die 1 and can move the plate part 13 below the first placement surface 3A of the molding die 1. The upper end side of the leg part 14 is connected to the plate part 13, and the lower end side thereof is connected to the fixing part 15.

The leg part 14 is provided with two rod-like members 14A and 14B connected in the height direction, for example. In the second connection part 17 to which the two rod-like members 14A and 14B are connected, the two rod-like members 14A and 14B rotate relative to one another. Until a predetermined load is applied, the second connection part 17 maintains the height of the leg part 14. When the back film 36 presses against the plate part 13 due to vacuum suction and a load of at least a prescribed amount is applied to the plate part 13 from above, the two rod-like members 14A and 14B are rotated relative to one another using the axis of the second connection part 17 as a fulcrum. The two rod-like members 14A and 14B rotate around the axis of the second connection part 17.

The fixing part 15 is linked to the base plate 2 by a bolt or the like, for example, so as to fix the movable stage 11 to the top of the base plate 2.

A third connection part 18 connected to the lower end of the leg part 14 is provided on one end side of the fixing part 15. In the third connection part 18 to which the fixing part 15 and the rod-like member 14B of the leg part 14 are connected, the rod-like member 14B of the leg part 14 rotates. Until a predetermined load is applied, the third connection part 18 maintains the height of the leg part 14. When the back film 36 presses against the plate part 13 due to vacuum suction and a load of at least a prescribed amount is applied to the plate part 13 from above, the rod-like member 14B is rotated with respect to fixing part 15 using the axis of the third connection part 18 as a fulcrum. The rod-like member 14B rotates around the axis of the third connection part 18.

In the second connection part 17 and the third connection part 18, the rod-like members 14A and 14B rotate so that the leg part 14 contracts in the height direction of the molding die 1. At this time, the position in the height direction of the first connection part 16 moves to a lower position from roughly the same height as the first placement surface 3A.

Elastic members such as compression springs 17A and 18A, for example, are respectively provided on the second connection part 17 and the third connection part 18 so as to maintain the height of the leg part 14 until a predetermined load is applied.

The elastic forces of the compression springs 17A and 18A of the second connection part 17 and the third connection part 18 are roughly equal, and the elastic force of the compression spring 16A of the first connection part 16 is lower than the elastic forces of the compression springs 17A and 18A. As a result, when the sealed space further inside than the back film 36 is decompressed to a vacuum pressure and a predetermined load is applied to the plate part 13, the plate part 13 is first rotated and inclined with respect to the leg part 14 as illustrated in FIG. 3 while the height of the leg part 14 is maintained. When vacuum suction is then continued, the plate part 13 is pressed downward by the back film 36 so that the leg part 14 bends.

When the leg part 14 bends completely, a state such as that illustrated in FIG. 4 is achieved. At this time, the leg part 14 remains compressed further inside than the back film 36. The fabric 20 is then impregnated with a resin in this state, and the fabric 20 impregnated with the resin is heated. Accordingly, the leg part 14 has a quality capable of withstanding the temperature when the resin is heated (for example, approximately 140° C.

As described above, with this embodiment, since the molding die 1 has a first placement surface 3A and a formation surface 3B, the fabric 20 is bent along the first placement surface 3A and the formation surface 3B so as to be formed into a cross-sectional shape corresponding to the molding die.

In addition, the state transitions from a state in which the first placement surface 3A of the molding die 1 and the second placement surface 13A of the movable stage 11 are of roughly the same height and the fabric 20 is placed on the first placement surface 3A and the second placement surface 13A, as illustrated in FIG. 2, to a state in which the second placement surface 13A of the movable stage 11 is inclined with respect to the first placement surface 3A, as illustrated in FIG. 3. The second placement surface 13A of the movable stage 11 is inclined with respect to the first placement surface 3A in a state in which the molding die 1 side is higher than the opposite side of the molding die 1 side. As a result, the fabric 20 is bent at the boundary between the first placement surface 3A and the second placement surface 13A along the edge of the first placement surface 3A of the molding die 1.

The second placement surface 13A then moves below the first placement surface 3A so that the fabric 20 is disposed along the formation surface 3B of the molding die 1. When the second placement surface 13A moves below the first placement surface 3A, the second placement surface 13A of the movable stage 11 is inclined with respect to the first placement surface 3A, and the fabric 20 is supported from below, Therefore, wrinkles and folds are less likely to be formed in the bent portion of the fabric 20 than when a movable stage 11 is not used.

In addition, as described above, when the fabric 20 is pressed using the back film 36, a pressing force is applied to the fabric 20 in the order of the location corresponding to the edge of the first placement surface 3A having the shape of the convex-shaped part 3 to the end of the fabric 20. As a result, sliding between each layer of the fabric 20 is possible, and the generation of wrinkles after shaping can be suppressed.

Second Embodiment

The fiber-reinforced plastic (FRP) producing device of a second embodiment of the present invention and a production method thereof will be described hereinafter with reference to FIGS. 5 to 8.

In the embodiment described above, a configuration in which the leg part 14 is fixed to the molding die 1 side and the end part on the opposite side of the molding die 1 side of the plate part 13 moves downward was described, but the position of the leg part 14 in the second embodiment differs from that of the first embodiment.

That is, in the second embodiment, as in the first embodiment, a movable stage 12 is disposed adjacent to the molding die 1. When the second placement surface 13A of the plate part 13 is in a horizontal state, the second placement surface 13A is an extension of the first placement surface 3A of the molding die and forms a continuous plane. Note that when applied to a molded product with an arc-shaped cross section or the like, the plate part 13 may not be disposed in a horizontal state at the stage prior to pressure by the back film 36. Also note that, as in the first embodiment, a gap of approximately 5 mm may be provided between the first placement surface 3A and the second placement surface 13A and that the position at which the first placement surface 3A and the second placement surface 13A described above continue from one another includes cases in which a gap is provided between the two units in this way.

The leg part 14 which supports the plate part 13 is then connected to the plate part 13 on the opposite side of the molding die 1 side of the plate part 13. The end part on the molding die 1 side of the plate part 13 then moves downward.

Figure 6:
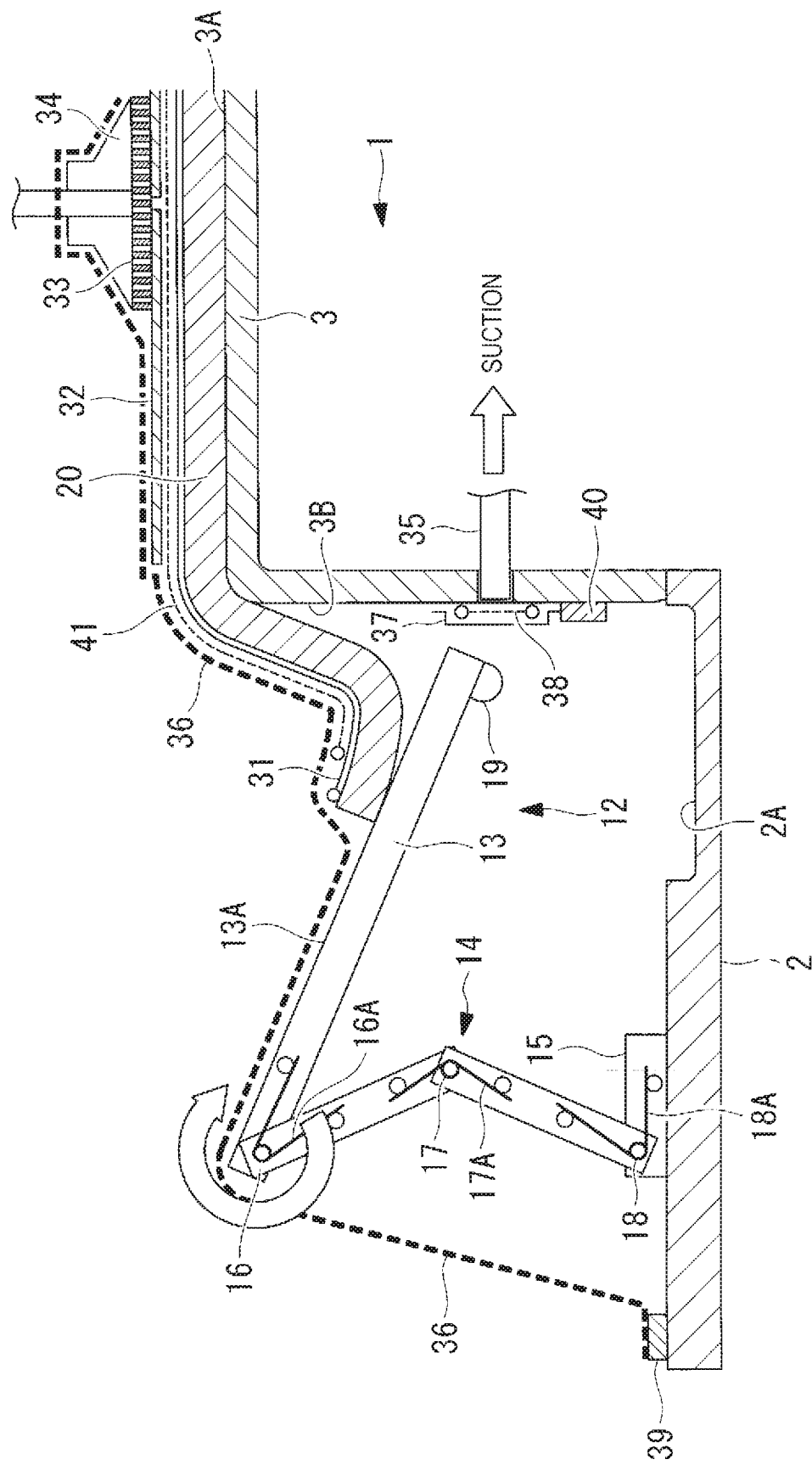
FIG. 6 is a vertical cross-sectional view illustrating the fiber-reinforced plastic producing device of a second embodiment of the present invention in a state in which the plate part of the movable stage is inclined.
Figure 7:
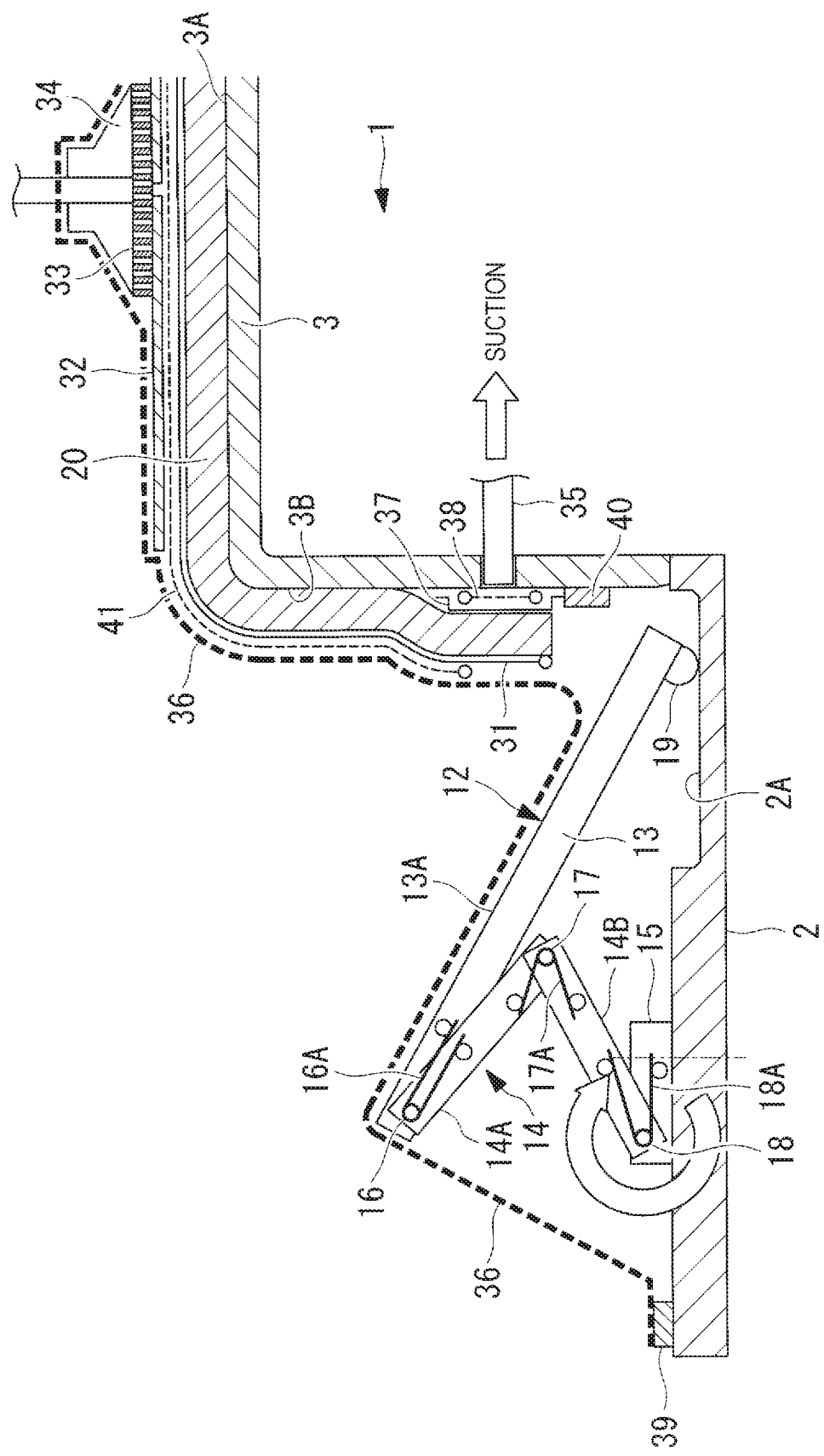
FIG. 7 is a vertical cross-sectional view illustrating the fiber-reinforced plastic producing device of a second embodiment of the present invention in a state in which the plate part of the movable stage is inclined and the end part is in contact with the base plate.
Figure 8:
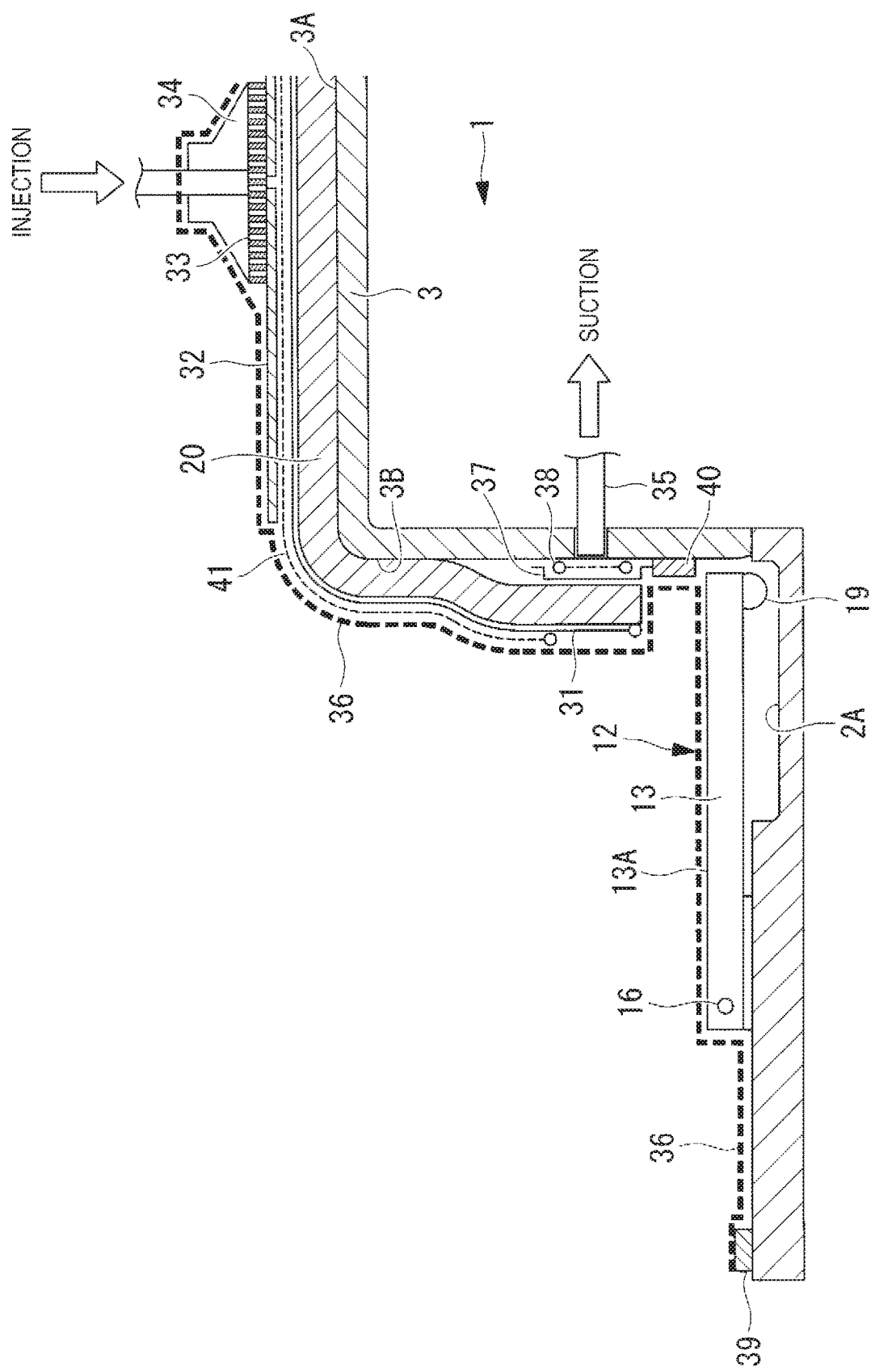
FIG. 8 is a vertical cross-sectional view illustrating the fiber-reinforced plastic producing device of a second embodiment of the present invention in a state in which the movable stage is collapsed.

In this embodiment, when the sealed space further inside than the back film 36 is decompressed to a vacuum pressure and a predetermined load is applied to the plate part 13, the plate part 13 is first rotated with respect to the leg part 14 as illustrated in FIG. 6 while the height of the leg part 14 is maintained. When vacuum suction is then continued, the plate part 13 is pressed downward by the back film 36 so that the leg part 14 bends, as illustrated in FIG. 7. When the leg part 14 bends completely, a state such as that illustrated in FIG. 8 is achieved.

The second placement surface 13A of the movable stage 12 is inclined with respect to the first placement surface 3A in a state in which the opposite side of the molding die 1 side is higher than the molding die 1 side. As a result, as illustrated in FIG. 6, the fabric 20 is bent at the edge of the first placement surface 3A and is bent near a point in contact with the second placement surface 13A. That is, when the second placement surface 13A of the movable stage 12 is inclined with respect to the first placement surface 3A, the fabric 20 is bent twice, and the respective bending directions are opposite one another, so misalignment is unlikely to occur between the inside layer and the outside layer of the fabric 20. In addition, since the second placement surface 13A of the movable stage 12 supports the fabric 20 from below, wrinkles are less likely to be formed in the bent portion of the fabric 20 than when a movable stage 11 is not used.

Note that in the embodiments described above, a case having a configuration in which the leg part 14 bends like a joint was described as the contraction mechanism in the height direction of the leg part 14 of the movable stage 11, but the present invention is not limited to this example. For example, the contraction mechanism in the height direction of the leg part may have a telescopic configuration which expands and contracts in response to one member moving in and out of another member.

REFERENCE SIGNS LIST

1 Molding die
2 Base plate
2A Groove
3 Convex-shaped part
3A First placement surface
3B Formation surface
11, 12 Movable stage
13 Plate part
13A Second placement surface
14 Leg part
15 Fixed part
16 First connection part
17 Second connection part
18 Third connection part
16A, 17A, 18A Compression spring
19 Guide member
20 Fabric
31 Fiber woven fabric
32 Pressure plate 33 Resin supply port
34 Injection port
35 Suction port
36 Back film
37 Permeable sheet
38 Permeable member
39, 40 Sealant
41 Resin pass medium

The invention claimed is:

1. A fiber-reinforced plastic producing device comprising:
a molding die having a first placement surface for a placement of a fabric and a formation surface having a predetermined angle with respect to the first placement surface; and
a movable stage having a plate part including a second placement surface for a placement of an end side of the fabric, and being disposed adjacent to the molding die,
wherein the movable stage further includes
a leg part which has a first rod member and a second rod member connected each other in a height direction, supports the plate part, and is configured to contact in a height direction of the molding die;
a first connection part with which the plate part and the first rod member of the leg part are connected so that the plate part is capable to rotate with respect to the first rod member of the leg part;
a second connection part with which the first rod member and the second rod member are connected so that the first rod member and the second rod member are capable to rotate with respect to each other;
a third connection part with which the second rod member and a fixing part for fixing the movable stage are connected so that the second rod member is capable to rotate with respect to the fixing part;
a first elastic member provided on the first connection part to support the plate part so that the second placement surface forms a continuous plane with the first placement surface in a horizontal state until a predetermined load is applied; and
a second elastic member and a third elastic member provided on the second connection part and the third connection part of the leg part, respectively, to maintain a height of the leg part until a predetermined load is applied,
wherein the plate part rotates with respect to the leg part in a state that a height of the leg part is maintained when a load of at least a prescribed amount is applied to the plate part from above so that an inclination angle of the second placement surface with respect to the first placement surface is increased, due to a lower elastic force of the first elastic member than an elastic force of the second elastic member and an elastic force of the third elastic member, and
wherein the leg part contracts in the height direction of the molding die when a further load of a prescribed amount is applied to the plate part from above so that an inclination angle of the second placement surface with respect to the first placement surface is decreased and the second placement surface is moved to a lower position from the first placement surface.

2. The fiber-reinforced plastic producing device according to claim 1, wherein the second placement surface of the movable stage is configured so as to be inclined with respect to the first placement surface in a state in which a first side of the second placement surface adjacent to the molding die is higher than a second side of the second placement surface furthest from the molding die.

3. The fiber-reinforced plastic producing device according to claim 1, wherein the second placement surface of the movable stage is configured so as to be inclined with respect to the first placement surface in a state in which a first side of the second placement surface furthest from the molding die is higher than a second side of the second placement surface adjacent to the molding die.

4. A movable stage comprising:
a plate part including a second placement surface disposed adjacent to a molding die having a formation surface having a predetermined angle with respect to a first placement surface, an end side of a fabric being placed on the second placement surface when the fabric is placed on the first placement surface;
a leg part which has a first rod member and a second rod member connected each other in a height direction, which supports the plate part, and which is configured to contract in a height direction of the molding die;
a first connection part with which the plate part and the first rod member of the leg part are connected so that the plate part is capable to rotate with respect to the first rod member of the leg part;
a second connection part with which the first rod member and the second rod member are connected so that the first rod member and the second rod member are capable to rotate with respect to each other;
a third connection part with which the second rod member and a fixing part for fixing the movable stage are connected so that the second rod member is capable to rotate with respect to the fixing part;
a first elastic member provided on the first connection part to support the plate part so that the second placement surface forms a continuous plane with the first placement surface in a horizontal state until a predetermined load is applied; and
a second elastic member and a third elastic member provided on the second connection part and the third connection part of the leg part, respectively, to maintain a height of the leg part until a predetermined load is applied,
wherein the plate part rotates with respect to the leg part in a state that a height of the leg part is maintained when a load of at least a prescribed amount is applied to the plate part from above so that an inclination angle of the second placement surface with respect to the first placement surface is increased, due to a lower elastic force of the first elastic member than an elastic force of the second elastic member and an elastic force of the third elastic member, and
wherein the leg part contracts in the height direction of the molding die when a further load of a prescribed amount is applied to the plate part from above so that an inclination angle of the second placement surface with respect to the first placement surface is decreased and the second placement surface is moved to a lower position from the first placement surface.

5. A shaped fabric producing method comprising:
placing a fabric on a first placement surface in a molding die having the first placement surface and a formation surface having a predetermined angle with respect to the first placement surface;
placing an end side of the fabric on a second placement surface set so as to form a continuous surface with the first placement surface in a movable stage having a second placement surface and being disposed adjacent to the molding die;

allowing the second placement surface to be rotated with respect to a leg part and to be inclined with respect to the first placement surface in a connection part with which the second placement surface and the leg part which supports the second placement surface are connected; and moving the second placement surface to below the first placement surface so that the leg part contracts in a height direction of the molding die, wherein, in the placing step of the end side of the fabric, when the second placement surface is in a horizontal state, the second placement surface forms the continuous plane with the first placement surface, in the inclining step of the second placement surface, when a load of at least a prescribed amount is applied to a plate part of which an upper surface is the second placement surface from above, the plate part rotates with respect to the leg part in a state that a height of the leg part is maintained so that an inclination angle of the second placement surface with respect to the first placement surface increases, and in the moving step of the second placement, a position in a height direction of the connection part moves to a lower position so that the leg part contracts and the inclination angle decreases.

6. The shaped fabric producing method according to claim 5, further comprising:

covering the fabric placed on the first placement surface and the second placement surface with a back film; and performing vacuum suction on a space further inside than the back film, wherein the space further inside than the back film is depressurized, and the back film presses against the second placement surface so that the second placement surface is inclined with respect to the first placement surface and moves below the first placement surface.

7. A fiber-reinforced plastic producing method comprising:

placing a fabric on a first placement surface of a molding die having the first placement surface and a formation surface having a predetermined angle with respect to the first placement surface;

placing an end side of the fabric on a second placement surface set so as to form a continuous surface with the first placement surface in a movable stage having a second placement surface and being disposed adjacent to the molding die;

allowing the second placement surface to be rotated with respect to a leg part and to be inclined with respect to the first placement surface in a connection part with which the second placement surface and the leg part which supports the second placement surface are connected;

moving the second placement surface to below the first placement surface so that the leg part contracts in a height direction of the molding die;

covering the fabric placed on the first placement surface and the second placement surface with a back film;

performing vacuum suction on a space further inside than the back film; and injecting a resin into the space further inside than the back film, wherein, in the placing step of the end side of the fabric, when the second placement surface is in a horizontal state, the second placement surface forms the continuous plane with the first placement surface, in the inclining step of the second placement surface, when a load of at least a prescribed amount is applied to a plate part of which an upper surface is the second placement surface from above, the plate part rotates with respect to the leg part in a state that a height of the leg part is maintained so that an inclination angle of the second placement surface with respect to the first placement surface increases, and in the moving step of the second placement, a position in a height direction of the connection part moves to a lower position so that the leg part contracts and the inclination angle decreases.

* * * * *